US010645419B2

(12) United States Patent
Wendel et al.

(10) Patent No.: US 10,645,419 B2
(45) Date of Patent: May 5, 2020

(54) SYSTEM ENCODER AND DECODER FOR VERIFICATION OF IMAGE SEQUENCE

(71) Applicant: NXP USA, Inc., Austin, TX (US)

(72) Inventors: Dirk Wendel, Grasbrunn (DE); Ritesh Agrawal, Ghaziabad (IN); Kshitij Bajaj, Sirsa (IN); Snehlata Gutgutia, Jamatara (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/397,325

(22) Filed: Jan. 3, 2017

(65) Prior Publication Data
US 2017/0332104 A1 Nov. 16, 2017

(30) Foreign Application Priority Data

May 10, 2016 (EP) .................................... 16168904

(51) Int. Cl.
H04N 19/65 (2014.01)
H04N 21/44 (2011.01)
H04N 19/89 (2014.01)
H04N 21/8358 (2011.01)
H04N 21/234 (2011.01)
H04N 21/442 (2011.01)
H04N 19/172 (2014.01)
H04N 19/186 (2014.01)

(52) U.S. Cl.
CPC ........... *H04N 19/65* (2014.11); *H04N 19/172* (2014.11); *H04N 19/186* (2014.11); *H04N 19/89* (2014.11); *H04N 21/234* (2013.01); *H04N 21/44* (2013.01); *H04N 21/442* (2013.01); *H04N 21/8358* (2013.01)

(58) Field of Classification Search
None
See application file for complete search history.

(56) References Cited

U.S. PATENT DOCUMENTS

| 4,758,877 | A | 7/1988 | Slavin |
| 6,297,845 | B1 | 10/2001 | Kuhn et al. |
| 6,992,797 | B1 | 1/2006 | Sharma et al. |
| 2003/0190078 | A1* | 10/2003 | Govindaswamy ..... H04N 19/89 382/232 |

(Continued)

FOREIGN PATENT DOCUMENTS

| EP | 1729529 A1 | 2/2005 |
| WO | 2015028098 A1 | 3/2015 |

Primary Examiner — James M Anderson, II

(57) ABSTRACT

The present application relates to a system for verifying integrity of a stream of image frames including an encoder logic module and a decoder logic module. On source side, a test line insertion logic module receiving the stream is arranged upstream to the encoder logic module encoding the stream. The test line insertion logic module is configured to include one or more test lines into the image frames. A color coding is assigned to the one or more test lines. The color coding is selected from a coding scheme. On destination side, a test line detection and extraction logic module is arranged downstream to the decoder logic module receiving the encoded stream. The test line detection and extraction logic module extracts the color coding from the received image frames and verifies extracted coding data against the coding scheme. The coding data comprises at least the extracted color coding.

18 Claims, 7 Drawing Sheets

(56) References Cited

U.S. PATENT DOCUMENTS

| | | |
|---|---|---|
| 2006/0013318 A1 | 1/2006 | Webb et al. |
| 2009/0147861 A1 | 6/2009 | Schnebly |
| 2010/0054340 A1 | 3/2010 | Reibman |
| 2011/0298986 A1* | 12/2011 | Schoenblum .......... H04N 5/213 |
| | | 348/699 |
| 2012/0281871 A1 | 11/2012 | Reed et al. |
| 2013/0259139 A1* | 10/2013 | Valdez ............... G06K 9/00744 |
| | | 375/240.25 |
| 2016/0295205 A1* | 10/2016 | Lim ..................... H04N 17/002 |

* cited by examiner

Coding Schemes

SYSTEM ENCODER AND DECODER FOR VERIFICATION OF IMAGE SEQUENCE

FIELD OF THE INVENTION

The present disclosure relates generally to a system for transmitting image data and in particular to a video transmission system with frame verification.

BACKGROUND

Various visioning and advanced drivers assistance systems of today's vehicle use and rely on images and image streams generated by various sources. Drivers for instance react on displayed information based on captured image data or automated systems initiate reactions in response to automated image recognition based on the captured image data. Hence, such image data represents safety relevant information. Nevertheless, image data represents safety relevant information not only in the automotive field but also in further fields of use including for instance transportation field in general, controlling of remote application, supervision of industrial production processes and medical equipment, to name only a non-limiting list of examples.

Those skilled in the art are aware, that functional safety is a primary issue when relying on safety relevant information for controlling an apparatus, to which the safety relevant information relates and the control of which requires an adequate reaction in response to the safety relevant information.

Safety relevant or safety related information represents information, an erroneous content of which might be directly responsible for death, injury or occupational illness, or the erroneous content of which may be the basis for decisions relied on, which might cause death, injury, other significant harms or other significant actions. Safety relevant or safety related information may be the output of safety critical application typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

Accordingly, there is an immanent and ongoing need for verification of the integrity of image data subjected to processing operations in an image data processing chain. In particular, the integrity verification is a need when the image data processed by the image data processing chain comprises safety related image data.

SUMMARY

The present invention provides a system for verification of a sequence of images, an encoder logic module of a system for verification of a sequence of images, a decoder logic module of a system for verification of a sequence of images, and a method of operating a system for verification of a sequence of images as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
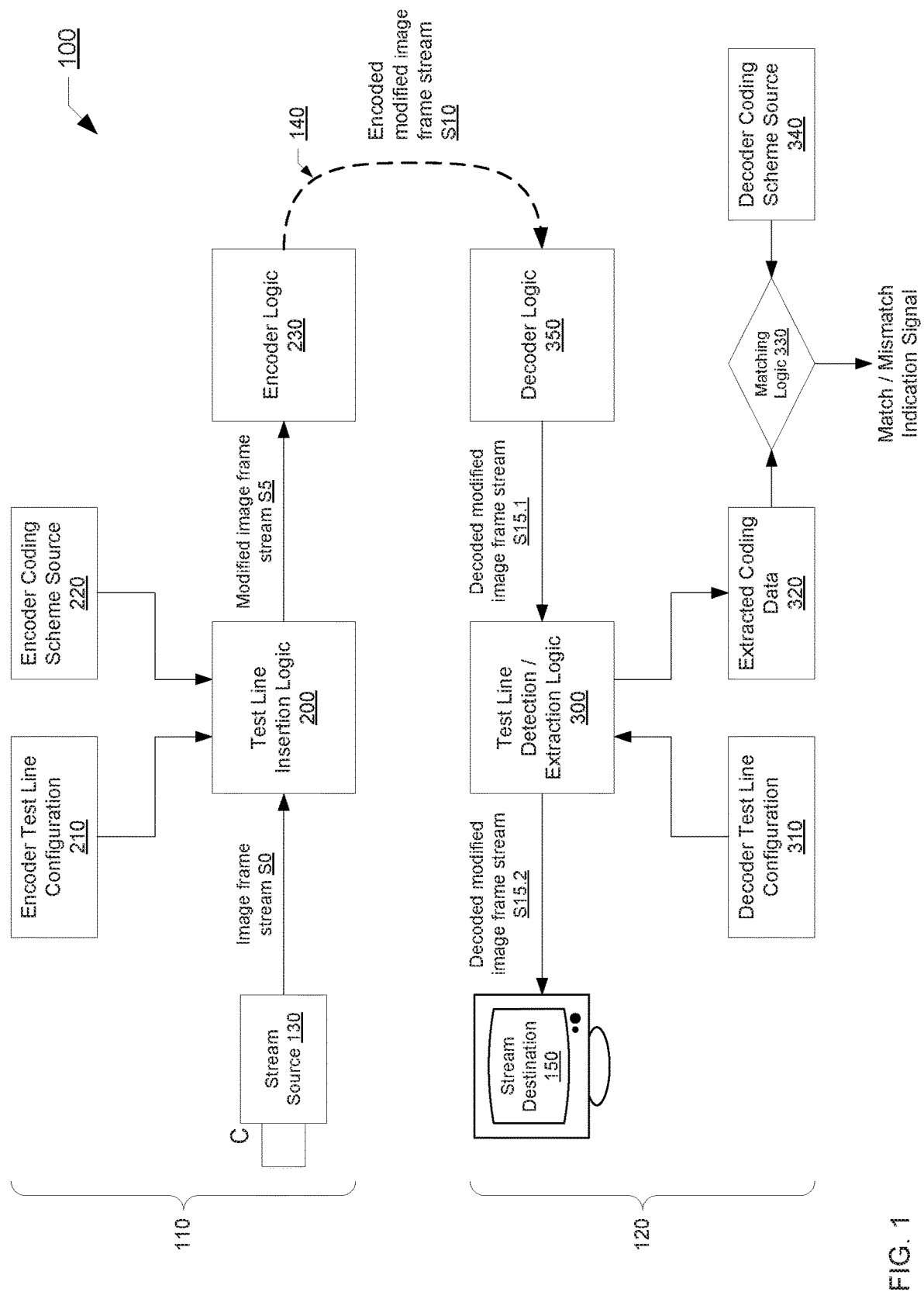
FIG. 1 schematically illustrates a block diagram of a system according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Referring to FIG. 1, a block diagram of system according to an example of the present application is schematically illustrated. The illustrated system may be understood to be composed of two parts, a source side system part 110 and a destination side system part 120.

At the source side system part 110, the system 100 comprises a test line insertion logic unit 200, which is configured to receive a stream S0 of image data from an image data streaming source 130 arranged upstream to the test line insertion logic unit 200. The test line insertion logic unit 200 is provided with an input to accept the stream S0 of image data from the image data streaming source 130 coupled thereto. The image data streaming source 130 is for instance a video camera or any other source capable of streaming image data. The stream S0 of image data is structured in image frames. Each image frame is to be understood as an image defined on the basis of a predefined number of image pixels when e.g. displayed in native resolution.

The test line insertion logic unit 200 receives the stream of image data in form of raw pixel data organized in subsequent image frames and is further configured to insert a number of test lines into the frames of the stream S0 of image data. In an example, the number of test lines are inserted into each frame of the stream S0. In the context of the present application, inserting one or more test lines into a frame should be understood in that the number of test lines may be inserted into the frame by replacing a corresponding number of lines of image pixels within the frame with the test lines resulting to a modified frame or the number of test lines may be appended to the frame resulting to a modified frame with extended dimension. The test line insertion logic unit 200 is provided with an output to supply a stream S5 of modified image data to the encoder logic unit 230 coupled thereto. The stream S10 of modified image data comprises the modified image frames generated by the test line insertion logic unit 200 by inserting the number of test lines into the received frames of the stream S0 of image data from the source 130.

The one or more test lines have been assigned a color coding. Each test line of the number of test lines may have the same color coding. The color coding comprises at least one color value assigned to the one or more test lines inserted into a frame. In an example, the color coding comprises two colors, the two colors of a color coding being different. In particular, each test line comprises a first section having assigned a first color value of the color coding and a second section having assigned a second color value of the color coding. Each test line has a predefined length, e.g. extending from one edge of the frame to another edge of the fame. Each test line has a predefined width; e.g. the width is one pixel. The first section and second section may have to same dimensions, e.g. the same longitudinal and transversal extensions.

The one or more test lines may be aligned with an edge of the frame; e.g. with the top/bottom or the left/right edge. The one or more test lines may be aligned with the rows or the columns of the frame, which represents a rectangular area having n×m pixels arranged in n columns and m rows. The one or more lines may be arranged at one of the edges of the frame. The test lines may be stacked in transversal direction and may be arranged adjacent with respect to the one or two neighboring test lines. The test lines may be arranged immediately adjacent with respect to the one or two neighboring test lines.

At least one of the parameters including position(s), the alignment(s) and the number of the test lines is configurable. The system comprises an encoder test line configuration storage 210. The at least one parameter is configurable. The encoder test line configuration storage 210 may comprise one or more registers for holding the configurable parameters, which may be accessed through an interface. The encoder test line configuration storage 210 may be accessed by software using an application program interface (API). The test line insertion logic unit 200 inserts the number of test lines into the frames of the stream S0 of image data in accordance with at least one of the parameters.

Test line insertion logic unit 200 is configured to assign color codings to the one or more test lines of a predefined number of N frames. In an example, the color codings assigned to two different frames of the predefined number of N frames differ in at least one color value and/or differ in the sequence order of the color values.

A set of N color codings is predefined. Every color coding of the set of N color codings is intended for a respective one of N frames. The N frames may be a subsequence of N subsequent frames out of the stream of image data.

This means for instance that one or more test lines are inserted into each frame of the stream. The color codings assigned to the one or more test lines may change every frame or every $2^{nd}$ frame, every $3^{rd}$ frame or, more generally, every $k^{th}$ frame, where k=1, 2, 3, . . . .

The encoder coding scheme source 220 is arranged to store the set of color codings or may be configured to generate the set of color codings. The encoder coding scheme source 220 may be a state machine configured according to the coding scheme. The color codings are selected from the set of color codings by the test line insertion logic unit 200 in a deterministic order. The test line insertion logic unit 200 is configured to select a color coding, next in sequence for each subsequent $k^{th}$ frame (where k=1, 2, 3, . . . ). In particular, the test line insertion logic unit 200 is configured to select consecutively a color coding from the set of color codings in deterministic order for each subsequent $k^{th}$ frame.

The set of N color codings comprises one or more sets of color values provided by the encoder coding scheme source 220. Each set of color values comprises or represents a deterministic sequence of color values. Such a sequence of color values may be predefined or may be generated on the basis of a predefined generator function. The predefined generator function may be parameterized with a predefined generator parameter. For instance, a pseudo-random number generator function seeded with a predefined seed value may be utilized to generate a deterministic sequence of color values of a given length.

For each subsequent $k^{th}$ frame, a color coding is selected from the set of color codings. In particular, the select color coding is a next consecutive color coding from the set of color codings in accordance with the deterministic order. For the remaining frames (the non-$k^{th}$ frames), the previously selected color coding is assigned to the one or more test lines.

An example of a coding scheme with a two color coding defined on the basis of a first set of color values and a second set of color values will be described now below with reference to example B schematically illustrated in FIG. 3.

Each color coding comprises a first color value and a second color value. The color coding to be assigned to one or more test lines of a frame is selected from the set of color codings provided by the encoder coding scheme source 220. In the example, a first color value is obtained from a first set of color values defined on the basis of a predefined sequence of N first color values. For each subsequent $k^{th}$ frame, a first color value next in order is obtained from the predefined sequence in a round-robin scheme, e.g. repeatedly starting with a first one in the predefined sequence once the last first color value is obtained; e.g. the individual color values of the predefined sequence are selected consecutively from the predefined sequence for a number of N subsequent $k^{th}$ frames. Once, the last individual color value of the predefined sequence is selected, the next individual color value is the first one in the predefined sequence.

A second color value may be obtained from a second set of color values defined on the basis of a predefined sequence of N second color values such as described above with reference to the predefined sequence of N first color value.

An example of a coding scheme with a two color coding defined on the basis of a set of common color values will be described now below with reference to example A schematically illustrated in FIG. 3.

In the example, a first color value and a second color value are obtained from a common set of color values defined on the basis of a predefined sequence of N (common) color values. The common set of color values is used to obtain the first color value and the second color value of a color coding. The first and second color values are selected with respect to an offset relating to a number of color values. The offset may be predefined. The first and second color values are selected from the common set of color values in a round-robin scheme.

An example of a coding scheme comprising a common set of color values will be described below with reference to example C schematically illustrated in FIG. 3.

In another example of the present application, the second color values is determined based on a signaling information supplied to the test line insertion logic unit 200. Each color value of the set of second color values is associated with a type of signaling information. The set of second color values may be comprises in a look-up table each entry associating a type of signaling information with a second color value.

An example of a coding scheme comprising a common set of color values will be described below with reference to example schematically illustrated in FIG. 7.

The encoder coding scheme source 220 may be accessed through an interface. The encoder coding scheme source 220 may be accessed by software using an application program interface (API).

The test line insertion logic unit 200 is arranged upstream to an encoder logic unit 230 of the system. The encoder logic unit 230 is coupled to the output of the test line insertion logic unit 200 to receive the stream S5 of modified image data therefrom. The encoder logic unit 230 is configured to encode the stream S5 of modified image data for transmitting to the destination side system part 120 of the system 100. In an example of the present application, the test line insertion logic unit 200 may be part of the encoder logic unit 230 and may make use of the buffers/registers of the encoder logic unit 230. For instance, the test line insertion logic unit 200 may have access to a line buffer of the encoder logic unit 230. The encoder test line configuration storage 210 and the encoder coding scheme source 220 may further be part of the encoder logic unit 230.

In an example, the encoder logic unit 230 is configured to apply a video codec to the stream S5 of modified image data to convert the stream S5 of modified image data in form of raw data to an encoded stream S10 of modified image data in form of compressed data. In another example, the encoder logic unit 230 is configured to apply an image compression codec to the image frames of the stream S5 of modified image data to convert the stream S5 of modified image data in form of raw data to an encoded stream S10 of modified image data in form of compressed data.

The encoded stream S10 of modified image data is outputted by the encoder logic unit 230 to be transmitted through a transmission medium 140 top the destination side system part 120. The encoded stream S10 (in form of compressed data) has a reduced (average) data rate in comparison to the data rate of the stream S5 (in form of raw data). The reduced data rate of the encoded stream S10 reduces the bandwidth requirements on the transmission medium 140 connecting between the source side system part 110 and the destination side system part 120. In an example of the present application, the transmission medium 140 is a wired transmission medium. The transmission medium 140 may comprise a shared medium such as a network connection including e.g. an Ethernet based connection, a Media Oriented Systems Transport (MOST) network and the like.

At the destination side system part 120, the system 100 comprises a decoder logic unit 350, which is configured to accept the encoded stream S10 of modified image data structured in modified image frames. The decoder logic unit 350 is configured to apply the video codec or the compression codec to the encoded stream S10 of modified image data to convert the encoded stream S10 of modified image data to a decoded stream S15.1 of modified image data in form of decompressed raw data.

Those skilled in the art understand that the data of the decoded stream S15.1 outputted by the decoder logic unit 350 may differ from the stream S5 of modified image data inputted to the encoder logic unit 230. Video codecs available to compress image data are typically lossy, meaning that a compressed video lacks some information present in the original video. Typical video codecs comprise MPEG-1 Part 2, MPEG-2, MPEG-4 Part 10 (AVC)/H.264, MPEG-H Part 2 (HEVC)/H.265-Codec, VP6 to VP9, VC-1, Ogg Theora and the like. The decompressed video has insufficient information to accurately reconstruct the original video. Likewise, lossy image compression/decompression codec may be applied to allow for an efficient compression of image data or frame data. Typical image compression/decompression codec comprise JPEG, JPEG 2000, PNG, HEVC for still pictures, DjVu and the like. Those skilled in the art understand that the present application is not to be understood to be limited to lossy video codecs or lossy image compression/decompression codecs. Lossless video codecs and/or lossless image compression/decompression codecs may be also used.

The decoded stream S15.1 of modified image data is supplied to a test line detection/extraction logic unit 300, which is arranged downstream to the decoder logic unit 350 in the system 100. The test line detection/extraction logic unit 300 is configured to extract the color coding of the one or more test lines inserted into the frames comprised in the decoded stream S15.1. The arrangement of the one or more test lines in the modified frames comprised in the decoded stream 15.1 is made known to the test line detection/extraction logic unit 300.

At least one of the parameters including the position(s), the alignment(s) and the number of test lines inserted in the frames may be supplied from a decoder test line configuration storage 310 of the system 100 to the test line extraction logic unit 300. The test line configuration storage 310 may comprise one or more registers for holding the configurable parameters, which may be accessed through an interface. The encoder test line configuration storage 210 may be accessed by software using an application program interface (API). The decoder test line configuration storage 310 may maintain at least one of the parameters corresponding to the at least one of the parameters maintained by the encoder test line configuration storage 210.

In an example of the present application, the matching logic unit 330 of the system 100 is configured to compare the extracted color coding against the color coding scheme. A first extracted color coding may be used as an initial value to initialize the color coding scheme. Once initialized, the matching logic unit 330 is enabled to verify whether or not the extracted color coding corresponds to the color coding expected according to the coding scheme.

The extracted color coding may form at least a part of the extracted coding data 320, which is provided to a matching logic unit 330 of the system 100, which is configured to compare the extracted coding data 320 against the color coding scheme. The extracted coding data 320 comprises the extracted color codings of a predefined number of subsequent $k^{th}$ frames, where k=1, 2, 3, . . . .

In an example of the present application, the matching logic unit 330 is configured to check, whether or not the extracted coding data 320 comprises a color coding sequence, which corresponds to a partial sequence of the color coding scheme.

In an example of the present application, the matching logic unit 330 is configured to check, whether or not the extracted coding data 320 is self-consistent. Those skilled in the art will understand from the above description of the assignment of the color values that the check of self-consistency is applicable in case a common set of color values is used for assigning the first and second color values to the color coding of the one or more test lines of a frame.

The color coding scheme may be provided by a decoder coding scheme source 340. The decoder coding scheme source 340 may correspond substantially to the encoder coding scheme source 220. The decoder coding scheme source 340 may be a state machine configured in accordance with the coding scheme. The above statements with respect to the encoder coding scheme source 220 apply likewise to the decoder coding scheme source 340. The color coding schemes provided by the encoder coding scheme source 220 and the decoder coding scheme source 340 substantially correspond to each other. The decoder coding scheme source 340 may be accessed through an interface. The decoder coding scheme source 340 may be accessed by software using an application program interface (API).

The matching logic unit 330 is further arranged to output an indication signal indicating a mismatch and/or match.

A decoded stream S15.2 of modified image data is output/forwarded by the test line extraction logic unit 300 for further processing/displaying, e.g. to a display 150 for being displayed to a user. The decoded stream S15.2 of modified image data may correspond to the decoded stream S15.1 of modified image data supplied by the decoder logic unit 350 to the test line extraction logic unit 300.

In an example of the present application, the test line extraction logic unit 300 is configured to delete test lines appended to each frame of the decoded stream S15.1 of modified image data. The decoded stream S15.2 of modified image data output by the test line extraction logic unit 300 comprises frames with original dimensions.

In an example of the present application, the test line detection and extraction logic unit 300 may be part of the decoder logic unit 350 and may make use of the buffers/registers of the decoder logic unit 350. For instance, the test line detection and extraction logic unit 300 may have access to a line buffer of the decoder logic unit 350. The decoder test line configuration storage 310, the matching logic unit 330 and the decoder coding scheme source 340 may further be part of the decoder logic unit 350.

Figure 2:
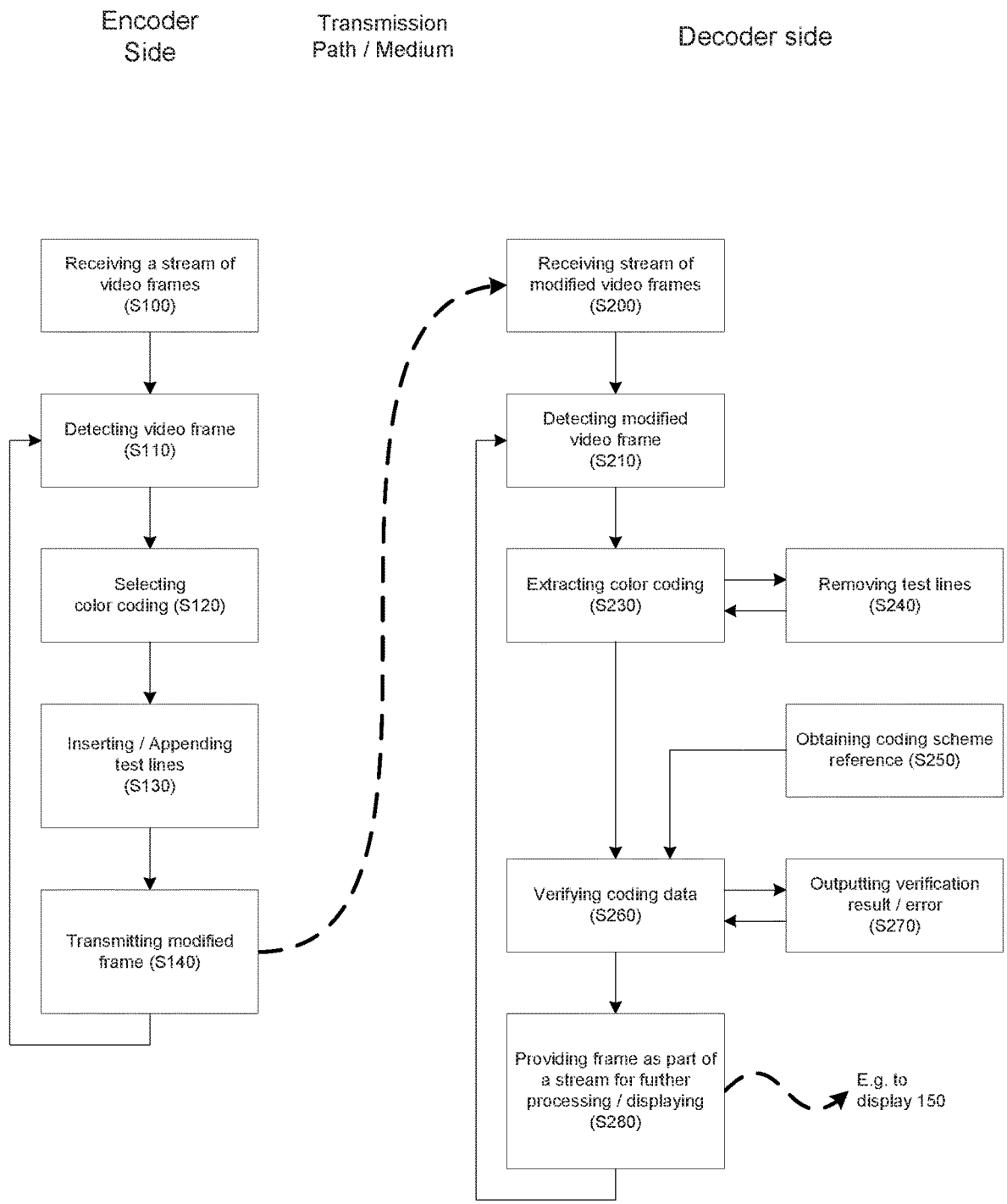
FIG. 2 schematically illustrates a flow diagram relating to the operations carried out by a system according to an example of the present invention.

FIG. 2 schematically illustrates a flow diagram relating to the operations carried out at a system according to an example of the present invention. The flow diagram illustrated in FIG. 2 in particular describes the operations carried out at the system 100 described above with reference to FIG. 1. For the sake of understanding, the following described comprises references back to the FIG. 1. The operation carried out by the system will be further illustrated with respect to the diagrammatic representation shown in FIGS. 3 to 5, which illustrate modified frames with included or appended test lines, round-robin color assignment schemes to assign colors to the color codings used in subsequent frames and color verification schemes for verifying the color codings used in one or more subsequent frames.

In an operation S100, a stream of image data is received by the test line insertion logic unit 200, e.g. from an image data streaming source 130 such as a video camera. The stream of image data is received in raw data and structured in subsequent image frames. The frames are in a raw data format to be displayed, in particular as a video sequence at a predefined frame rate.

In an operation S110, the test line insertion logic unit 200 detects a current frame in the stream S0 of image data received from the source 130.

In an operation S120, the color coding for the detected current frame is determined based on the color coding scheme. The color coding scheme comprises a set of color codings, each of which for being assigned to an image frame. The color codings of the set are assigned sequentially to the incoming image frames. In an example, a next color coding out of the set of predefined color codings is assigned to every $k^{th}$ image frame of the incoming stream, where k=1, 2, 3, . . . .

Figure 3:
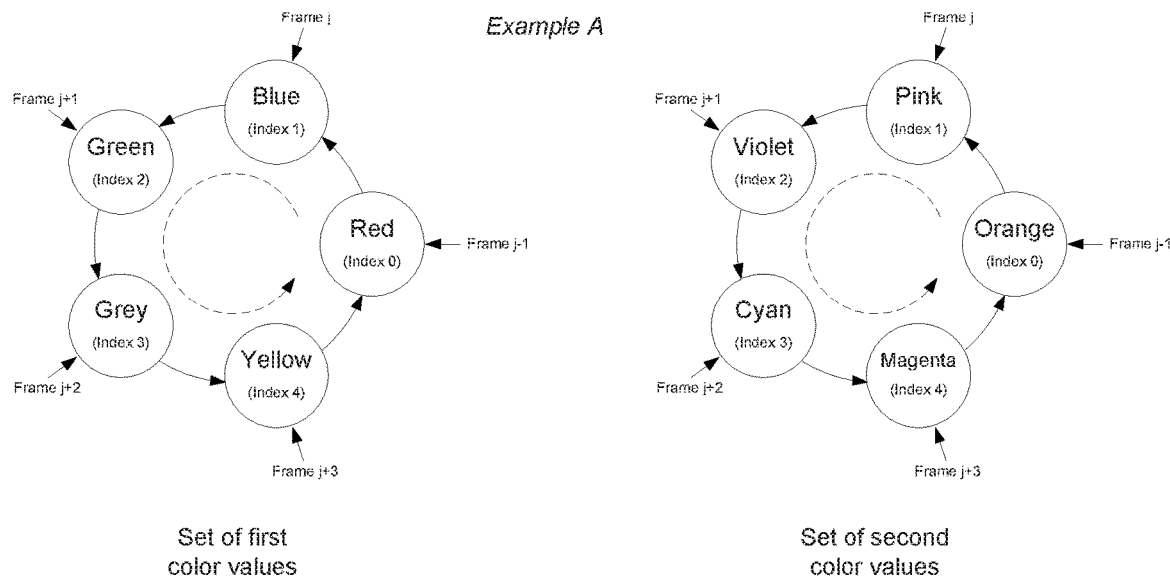
FIG. 3 illustrates diagrammatic representations of coding schemes according to examples of the present invention.
Figure 3:
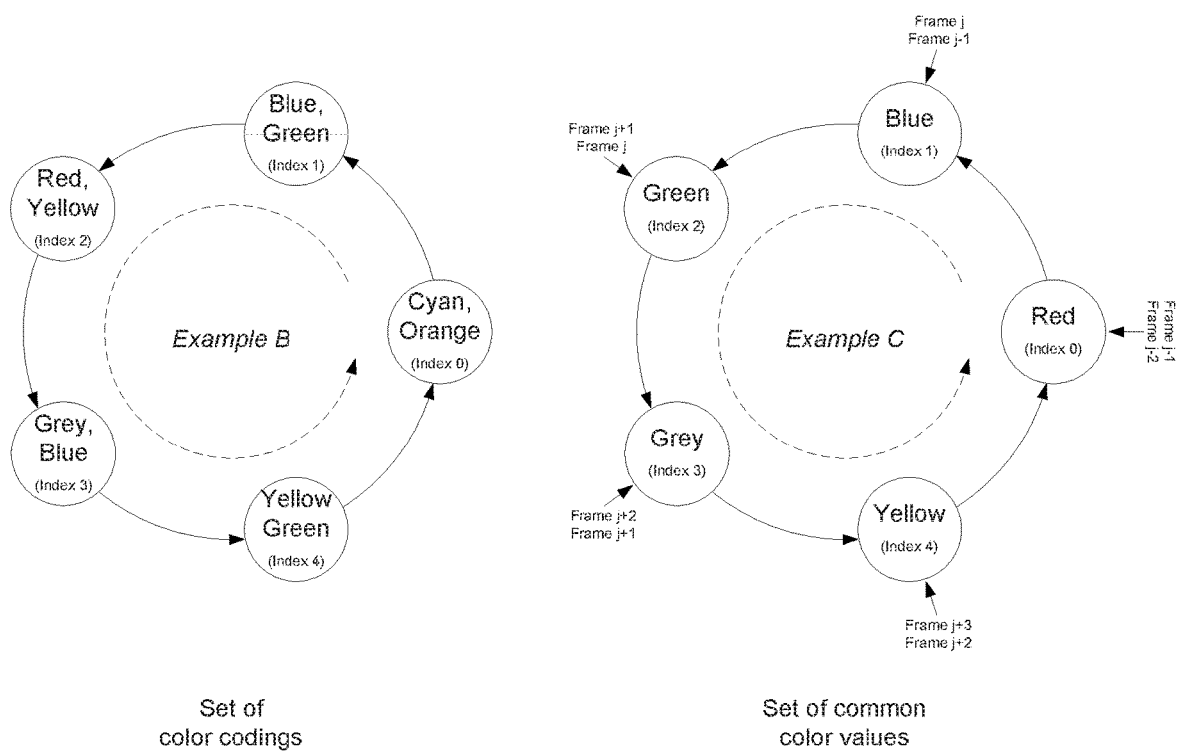

In example A illustrated in FIG. 3, the set of color codings has N=5 entries (for the sake of illustration only and without limitation to the generality) and comprises two predefined sets of color values: a set of first color values and a set of second color values. As mentioned above, the one or more test lines, to which a color coding is assigned, may comprise two different color values. For instance, the current frame is the frame j and one color value is selected from each of the set of first color values and the set of second color values in round-robin scheme.

Each color value of the sets may be identified by a consecutive index i. The color value to be used for selecting the color coding of one or more test lines of the current frame j may be determined as following:

$$i = j \bmod N,$$

where the index i is used for retrieval of the first and second color values from both sets of color values.

Assume for instance that i=1 for the fame j. The color coding for one or more test lines comprises the color values "Blue" and "Pink" For the subsequent frame j+1, the color coding comprises the color values "Green" and "Violet", for the next but one subsequent frame j+2, the color coding comprises the color values "Grey" and "Cyan" and so on.

Please note that the numbers of entries of the set of first color values and the set of second color values may be the same or may differ.

In example B illustrated in FIG. 3, the set of color codings has N=5 entries (for the sake of illustration only and without limitation to the generality). Each color coding comprises two predefined colors, which differ from each other. Assume again that i=1 for the fame j, for instance. A color coding is selected from the set of color codings in round-robin scheme for each subsequent frame. For instance, for the frame j, the used color coding comprises the color values "Blue" and "Green", for the subsequent frame j+1, the used color coding comprises the color values "Red" and "Yellow", for the next but one subsequent frame j+2, the used color coding comprises the color values "Grey" and "Blue" and so on.

In example C illustrated in FIG. 3, the set of color codings has N=5 entries (without limitation to the generality) and comprises a set of common color values. The first and second values are selected from the set of common color values in accordance with an index offset, e.g. an offset of Δ=1 (for the sake of illustration only).

The color values for the color coding of the one or more lines of the current frame j may be determined as following:

$$i\_1 = j \bmod N, \text{ and}$$

$$i\_2 = (j+\Delta) \bmod N,$$

where the index i_1 is used for retrieval of the first color value from the common set and index i_2 is used for retrieval of the second color value from the common set.

Assume for instance that i_1=1 for the fame j. The color coding for the one or more test lines comprises the color values "Blue" and "Green" For the subsequent frame j+1, the color coding comprises the color values "Green" and "Grey", the next but one subsequent frame j+2, the color coding comprises the color values "Grey" and "Yellow" and so on.

In an operation S120, the one or more test lines with the color coding selected for the current frame are included into the current frame resulting in a modified frame. The one or more test lines may be inserted into or may be appended to the current frame in accordance with the test line configuration.

Figure 4:
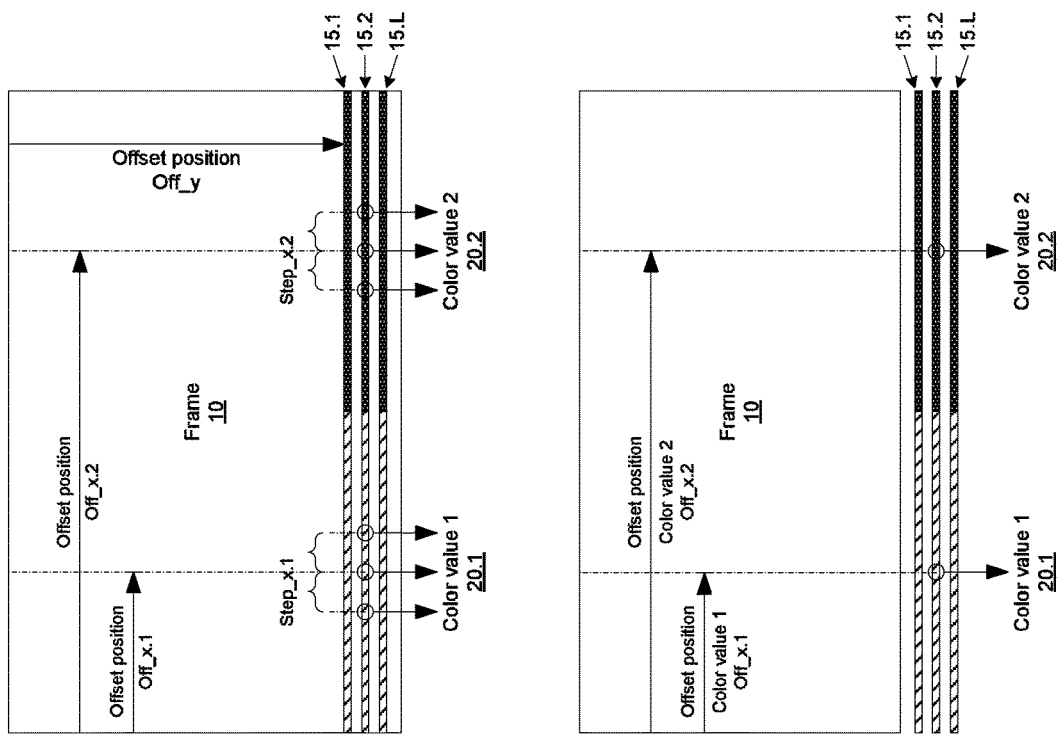
FIG. 4 illustrates diagrammatic representations of modified frames with test lines according to examples of the present invention.

As illustrated in FIG. 4 each frame 10 has a predefined dimension, e.g. Dim_x pixels/columns across Dim_y pixels/rows. The test line configuration for instance comprises a number parameter L indicative of the number of test lines 15 and may further comprise an offset parameter Off_y.

In the example A illustrated in FIG. 4, a number of L test lines 15.1 to 15.L are inserted into the current frame 10 starting at a row position defined by the offset parameter Off_y measured from the top edge. The number of L test lines 15.1 to 15.L are aligned with the top/bottom edge of the frame 10. The number of L test lines 15.1 to 15.L extend from the left edge to the right edge of the frame 10. Each test line 15 has a first section 20.1 colored according to the first color of the assigned color coding and a second section 20.2 colored according to the second color of the assigned color coding. The longitudinal extensions of the sections are the same.

In the example B illustrated in FIG. 4, a number of L test lines 15.1 to 15.L are appended to the current frame 10 at the bottom edge. The number of L test lines 15.1 to 15.L are aligned with the top/bottom edge of the frame 10. The number of L test lines 15.1 to 15.L extend from the left edge to the right edge of the frame 10. Each test line 15 has a first section 20.1 colored according to the first color of the assigned color coding and a second section 20.2 colored according to the second color of the assigned color coding. The longitudinal extension of the sections is the same.

In an operation S140, the modified frames are transmitted from the source side of the system to the destination side of the system in form of a stream S10 of modified image data comprising the modified frames as output by the test line insertion logic unit 200. The transmission comprises encoding the stream of modified image data in accordance with any image de-/compression codec or video codec.

In an operation S200, the stream of modified image data is received. The reception comprises decoding the stream of modified image data in accordance with the image de-/compression codec or video codec used for encoding.

In an operation S210, the test line detection and extraction logic unit 300 detects a current frame in then stream of modified image data.

In an operation S230, the color coding of the one or more detected test lines included in the current detected frame is extracted. The color coding may be detected from at least one test line of the one or more test lines included in the current frame. Each color value of the color coding may be detected from at least one pixel of one test line. More general, each color value of the color coding may be detected from several pixels of one or more test line. An averaging algorithm may be applied to the color values of the several pixels to extract the color coding from the detected frame.

The position(s) of the one or more test lines is predefined in the decoder test line configuration. The predefined position(s) of the one or more test lines included in the decoder test line configuration substantially corresponds to the position(s) of the one or more test lines predefined in the encoder test line configuration. In an example, the decoder test line configuration substantially corresponds to the decoder test line configuration.

As illustrated in the example A of FIG. 4, the number of L test lines 15.1 to 15.L are inserted into the current frame 10 starting at a row position defined by the offset parameter Off_y measured from the top edge. The color coding is for instance extracted from a number of pixels of each section 20.1, 20.2 of one test line e.g. test line 15.2. The locations of the pixels may be defined on the basis of offset parameters Off_x.1 and Off_x.2 and respective step widths step_x.1 and step_x.2.

As illustrated in the example B of FIG. 4, the number of L test lines 15.1 to 15.L are appended to the current frame 10 at the bottom edge. The color coding is for instance extracted from a pixel of each section 20.1, 20.2 of one test line, e.g. test line 15.2. The locations of the pixels may be defined on the basis of offset parameters Off_x.1 and Off_x.2.

The offset parameters Off_x.1 and Off_x.2 may be defined on the basis of the center of the respective sections. The offset parameters Off_x.1 and Off_x.2 may be part of the decoder test line configuration. The step widths step_x.1 and step_x.2 may be part of the decoder test line configuration.

In an operation S240, the one or more test lines appended to the current frame may be removed from the current frame.

In an operation S260, the coding data is verified. The coding data comprises at least the color coding extracted from the current frame. In an example, the verifying is performed on the basis of coding data comprising the color coding extracted from the current frame and color codings extracted from a predefined number of previous frames. In an example, the verifying is performed against the coding scheme applied for selecting the color coding by the test line insertion logic unit 200. The coding scheme may be obtained in an operation S250.

The extracted coding data is verified against the coding scheme whether or not the extracted color coding data is consistent with the coding scheme.

In an example, the coding data comprises the color coding extracted from the current frame. The coding data is verified against the coding scheme, which is initialized by the extracted color coding of a previous image frame. Once initialized, the verification checks whether or not the color coding extracted from the current frame matches with the predefined deterministic sequence of color codings in accordance with the applied coding scheme.

Figure 5:
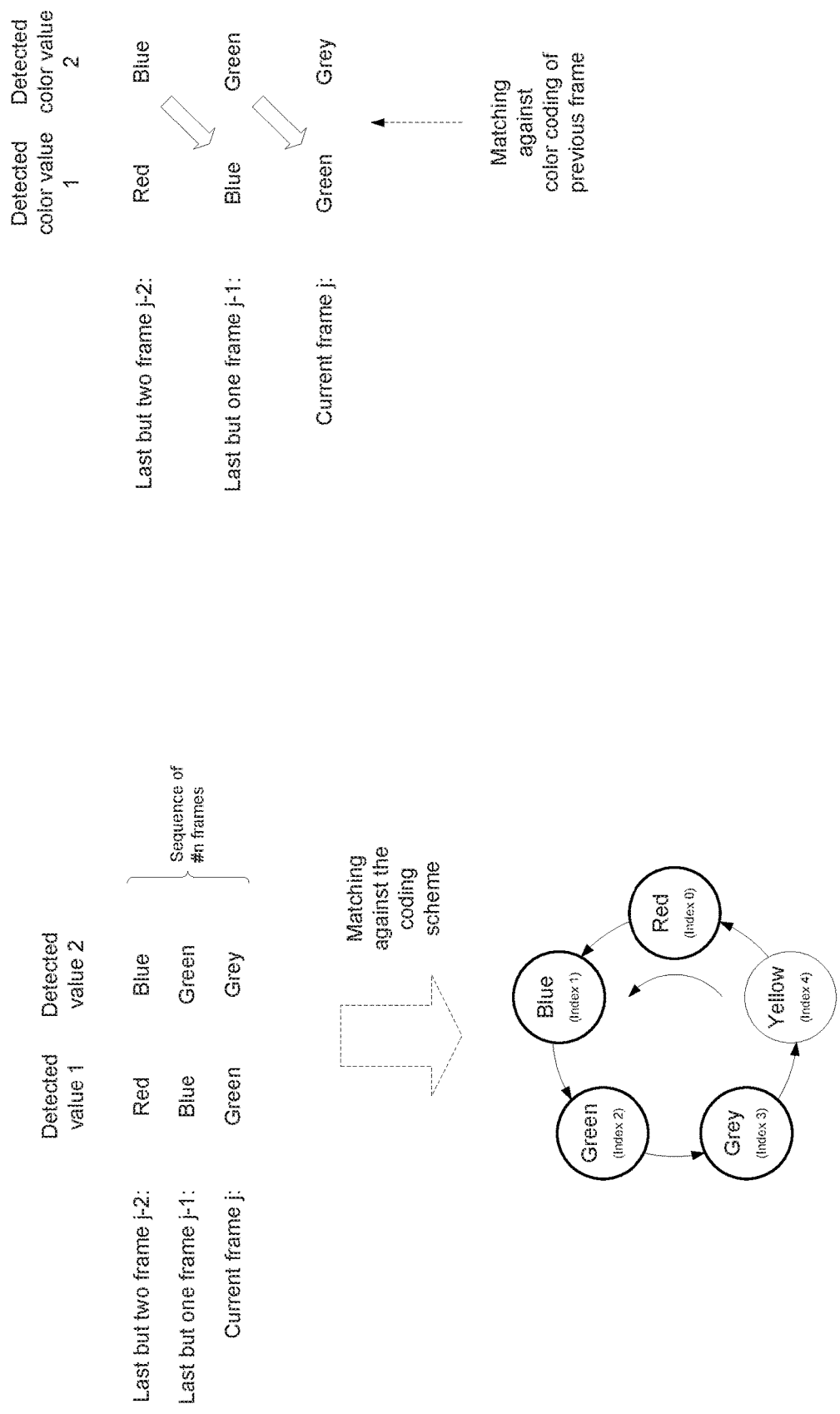
FIG. 5 illustrates diagrammatic representations of coding verifications according to examples of the present invention.

As further illustrated in Example A of FIG. 5, the extracted color coding data may comprise the color coding of the current frame, herein frame j, and the color codings of previous frames, herein two previous frames j−1 and j−2. More generally, the color coding data comprises the extracted color codings of a predefined number of immediate previous frames. For the sake of illustration, the color coding data comprises the color coding "Green" and "Grey" corresponding to the current frame j, the color coding "Blue" and "Green" corresponding to the frame j−1, and the color coding "Red" and "Blue" corresponding to the frame j−2.

The extracted color coding data is verified whether or not the extracted color coding data of the three frames represent a subsequence obtainable from the coding scheme. The extracted color coding data is matched against the coding scheme applied for assigning the color coding to the one or more test lines.

In the present example, it should be assumed that the color coding scheme as illustrated with reference to the example C of FIG. 3 is used. The color coding data of the frames j, j−1 and j−2 represents a valid subsequence of color codings according to the color coding scheme of example C illustrated in FIG. 3. In case it is assumed that the color coding scheme as illustrated with reference to the example A or B of FIG. 3 is used, the matching of the extracted coding data against the respective coding scheme would yield to a mismatch.

In an example, the extracted coding data is verified for self-consistency. Extracted coding data can be verified for self-consistency in case the color coding scheme comprises a set of common color values for selecting the first and second color values of a color coding assigned to the one or more test lines of a frame. The first and second color values are selected from the set of common color values with a predefined (fixed) offset Δ of color values relating to the predefined sequence of common color values, wherein |Δ|≥1. As exemplified with reference to the example C shown in FIG. 3, the color value offset may be Δ=1. According to the coding scheme based on a predefined sequence of common color values, the first color value of the frame j−Δ(j−|Δ|) and the second color value of the frame j are the same. More generally, the respective first and second color values of two frames at a frame distance (with respect to the frame sequence order) equal to the color value offset are the same.

As illustrated in FIG. 5, the respective color values of the frames j−2 and j−1 are the same ("Blue") as expected for the coding scheme of example C of FIG. 3 with a color value offset Δ=1. The respective color values of the frames j−1 and j are the same ("Green").

It should be further noted that image compression aim at reducing the number of bits needed to represent an image or video by removing spatial and spectral redundancies as much as possible, while video compression is achieved by removing temporal redundancy as well. The compression techniques may further employ irrelevancy reduction reducing information unnoticed by the observer.

Image de/compression codecs or video codecs applied to encode and decode image data streams are typically based on lossy data compression algorithms. Lossless data compression algorithms as known in the art and allow to reconstruct images or sequences of images after applying a lossless compression/video codec, which are bit identical to the original ones. However, the data reduction achieved by lossless data compression algorithms is typically modest only. Lossy data compression algorithms achieve substantial data reduction but are accompanied by loss of information such that reconstruction of images or sequences of images after applying a lossy compression/video codec are not bit identical to the original ones. The data reduction in particular achievable by Lossy image de/compression codecs or video codecs translates well into bandwidth and/or size requirements to be met e.g. when transmitting the images or videos via a bandwidth limited transmission medium.

The effective data reduction is accompanied by a degradation in resolution and color reproduction due to loss of information when applying a lossless compression/video codec.

In order to take account of the possible change of resolution due to the encoding and subsequent decoding of the stream of modified frames, one or more test lines are included into the image frames, which in particular extend from one edge of the opposite edge of the respective image frame. The number of test lines allow for adjusting to different levels of degradation resulting from image de/compression codecs or video codecs applied to encode and decode image data streams.

In order to take account of possible color changes due to the encoding and subsequent decoding of the stream of modified frames, a color difference margin or color distance margin is considered when comprising the color values of the extracted coding data against color values as defined by the applied coding scheme.

For instance, the color "Green" may be represented by the component values (Y, Cb, Cr)=(112, 72, 58) in luma and chroma color coding and the color "Red" may be represented by the component values (Y, Cb, Cr)=(65, 100, 212) in luma and chroma color coding. The color distance margin is for instance (ΔY, ΔCb, ΔCr)=(±10, ±10, ±10).

Assume that variables Y, Cb, Cr store the component values of an extracted color value:
if (102<Y<122 and 62<Cb<82 and 48<Cr<68) then color="Green"
if (55<Y<75 and 90<Cb<110 and 202<Cr<222) then color="Red"

In an operation S270, the verification error signal is output in case the verification of the extracted coding data against the coding scheme results in a mismatch. In an example, a verification match signal is output otherwise.

A verification error signal is for instance output in case of a frame image geometry distortion, a frozen frame sequence, frames with false colors, empty frames, frames with random data or frames with image noise. Such errors may occur in a video processing system according to examples of the present invention. In particular, the image data streaming source 130 may fail to output the stream of image data, the encoder logic unit 230 may generate a defective encoded stream and/or the decoder logic unit 350 may generate a defective decoded stream. The encoder logic unit 230 or the decoder logic unit 350 may fail to output a stream due to internal failure. Further, the transmission medium 140 may fail to transmit the encoded stream from source side 110 to destination side 120.

The suggested verification methodology allows for verifying the image data processing path for failure. The data processing path comprises at least the encoder logic unit, the decoder logic unit and the transmission medium path connecting the encoder logic unit to the decoder logic unit.

In an operation S280, the stream of modified frames is output/forwarded to an image data stream processing/displaying destination 150 for further processing and/or displaying, e.g. to a display for being displayed to an observer/driver.

With reference to the above examples, a coding scheme comprising two color values is exemplified. From the above description, it is immediately understood by the skilled person that the coding scheme may comprise a different number of color values to be assigned to the one or more test lines of a frame; in particular more than two color values may be assigned to the one or more test lines of a frame.

Moreover, it should be noted that in the above examples a next color coding according to a given coding scheme is assigned to every subsequent frame and the one or more inserted test lines. However, those skilled in the art immediately understand from the above description that a next color coding may be likewise applied to every subsequent $k^{th}$ frame, where k=2, 3, 4, . . . , and the remaining frames have assigned the previously assigned color coding. At the verification stage of the test line extraction logic unit 300, the extracted color coding of every subsequent $k^{th}$ frame (k=2, 3, 4, . . . ) is verified against the applied coding scheme to check for consistency without departing from the general concept described above.

Figure 6:
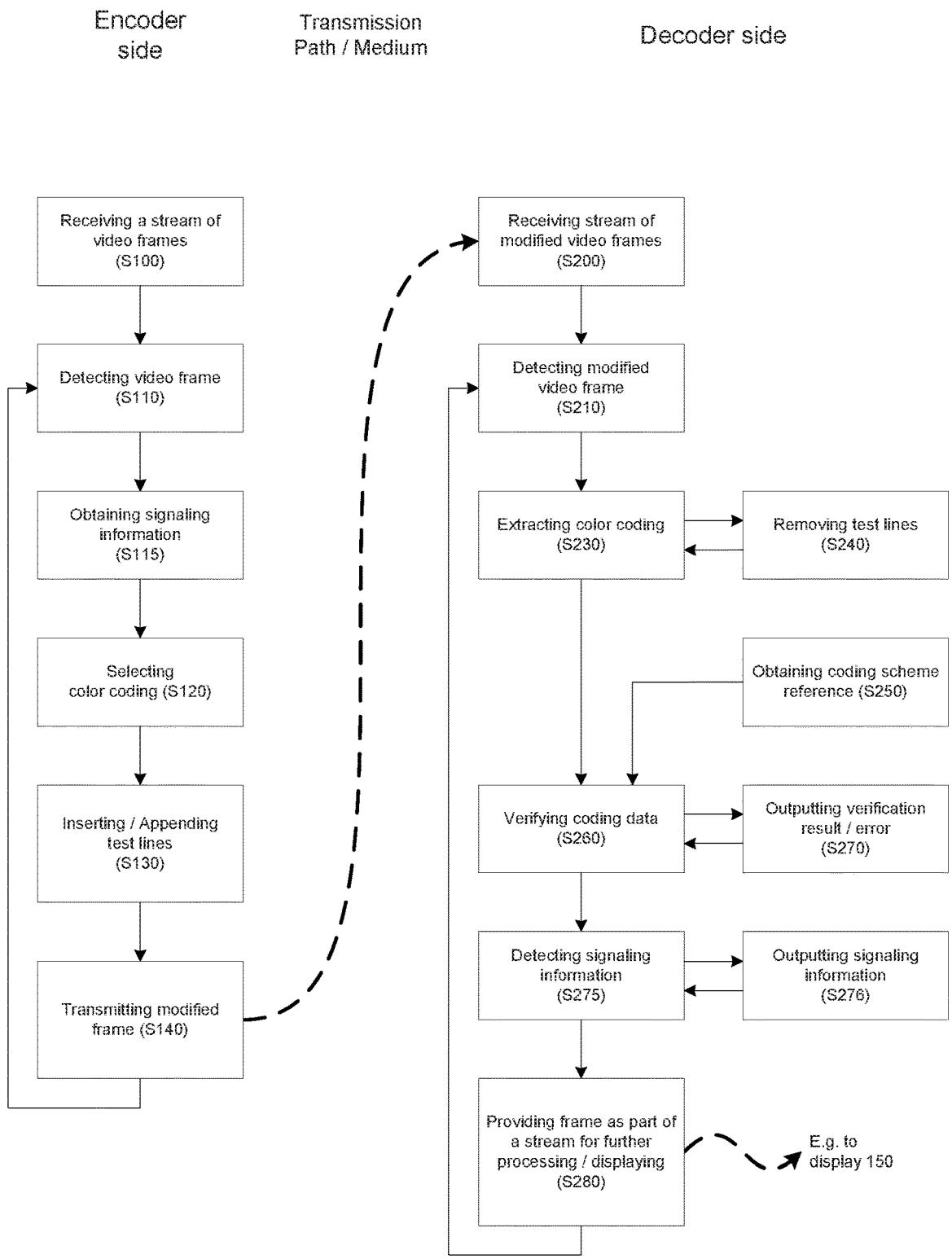
FIG. 6 schematically illustrates a flow diagram relating to the operations carried out by a system according to a further example of the present invention.

FIG. 6 schematically illustrates a flow diagram relating to the operations carried out at a system according to another example of the present invention. The flow diagram illustrated in FIG. 6 in particular describes the operations carried out at the system 100 described above with reference to FIG. 1. For the sake of understanding, the following described comprises references back to the FIG. 1. The operation carried out by the system will be further illustrated with respect to the diagrammatic representation shown in FIG. 7, which illustrates round-robin color assignment schemes to assign colors to the color codings used in subsequent frames and color verification schemes for verifying the color codings used in one or more subsequent frames.

Furthermore, the flow diagram shown in FIG. 6 may be considered as a modification of the flow diagram shown in FIG. 2. For the sake of omitting unnecessary repetition, operations already described above with reference to FIG. 2 will not be repeated in the following. Same or similar operations are referred to with the same reference numeral.

In the present example, the color coding scheme applied to assign color codings to the one or more test lines of the frames of the video stream is used to transmit signaling information from the source side to the destination side of the system 100. The signaling information comprises for instance indication type information such as no indication, warning indication and alert indication.

The color coding for a frame comprises for instance two color values. One or the color values, for instance the first color value, is assigned on the basis of a predefined sequence of first color values as described above with reference to FIGS. 2 to 4. In particular, the first color value is selected from a predefined sequence of N (e.g. N=5) color values in round-robin scheme for each subsequent frame of the video stream S5. The other one of the color values, for instance the second color value, is assigned in accordance with a predefined look-up table associating an indication type information with a color value.

Figure 7:
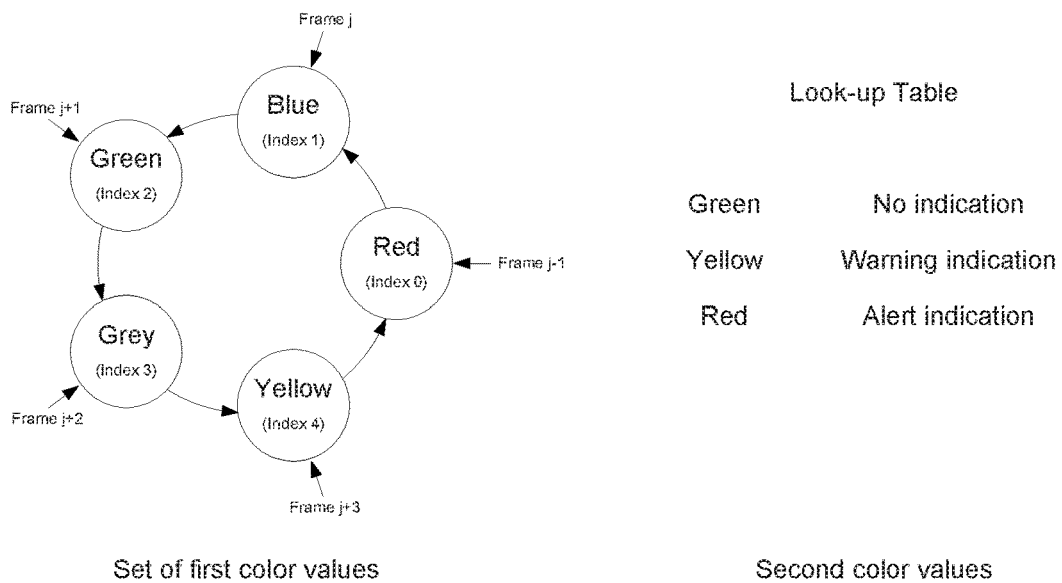
FIG. 7 illustrates diagrammatic a representation of a coding scheme according to a further example of the present invention.

As exemplified in FIG. 7, the look-up table may comprise the indication type information "no indication", "warning indication" and "alert indication" each associated with a respective one of the color values "Green", "Yellow" and "Red".

On source side part 110 of the system 100, the signaling information is obtained, in an operation S115, and the color coding is selected on the basis of the predefined sequence of first color values and further the obtained signaling information, in an operation S120.

The frame is detected and the selected color coding is assigned to one or more test lines included into a detected frame as described above with reference to FIG. 2 and in particular with reference to operations S100, S110 and S120 thereof.

On destination side part 120 of the system 100, the color coding of the included one or more test lines is extracted for verification of the color coding and for determining the transmitted signaling information.

The color coding assigned to the one or more test lines of a detected frame is detected and extracted form a frame at the destination side system part 120 as described above with reference to FIG. 2 and in particular operations S200, S210, S230 and S240.

In an operation S260, the coding data is verified. The coding data comprises at least the color coding extracted from the current frame. In an example, the verifying is performed on the basis of coding data comprising the color coding extracted from the current frame and color codings extracted from a predefined number of previous frames. In an example, the verifying is performed against the coding scheme applied for selecting the color coding by the test line insertion logic unit 200. The coding scheme may be obtained in an operation S250.

The extracted coding data is verified against the coding scheme whether or not the extracted color coding data is consistent with the coding scheme. The verification of consistency with the coding scheme may be initialized by the color coding extracted from any previous frame. Once initialized, the extracted coding data is compared with the expected coding data according to the coding scheme. In particular, the color coding extracted from the current frame is compared with the expected color coding in accordance with the predefined deterministic sequence of color codings of the applied coding scheme initialized (seeded) by the color coding extracted from any previous initializing frame.

Figure 8:
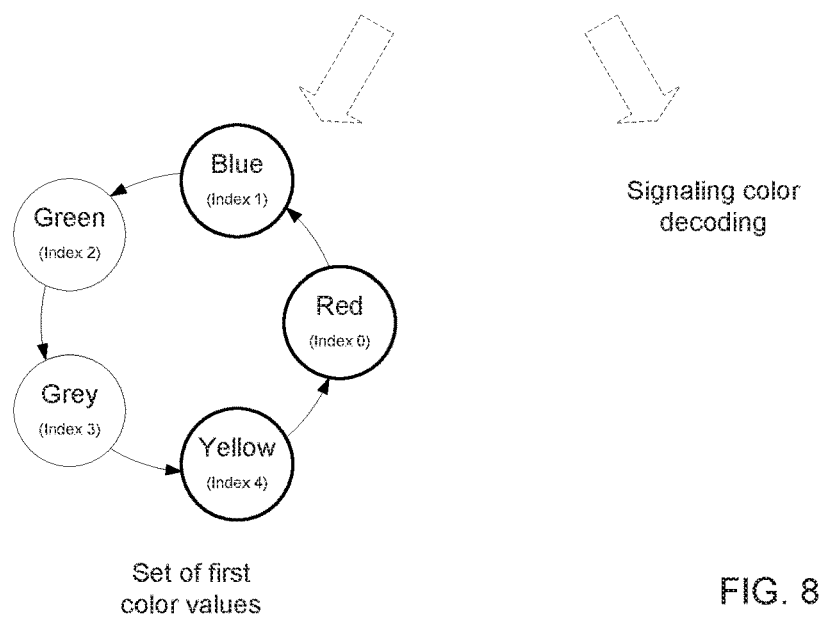
FIG. 8 illustrates diagrammatic a representation of coding verification according to a further example of the present invention.

As illustrated in FIG. 8, the extracted color coding data comprises the color coding of the current frame, herein frame j, and the color codings of two previous frames, herein frames j−1 and j−2.

More generally, the color coding data comprises the extracted color codings of a predefined number of immediate previous frames. For the sake of illustration, the color coding data comprises the color coding "Blue" and "Red" corresponding to the current frame j, the color coding "Red" and "Green" corresponding to the frame j−1, and the color coding "Yellow" and "Yellow" corresponding to the frame j−2.

The first color values of the color coding data is verified whether or not the extracted color coding data of the three frames represent a subsequence obtainable from the coding scheme. The extracted color coding data is matched against the coding scheme applied for assigning the color coding to the one or more test lines.

In the present example, it should be assumed that the color coding scheme as schematically illustrated FIG. 7 is used. The first color values of the coding data of the frames j, j−1 and j−2 represents a valid subsequence of color codings according to the color coding scheme of the example illustrated in FIG. 7.

The second color values of the color coding relates to codings of signaling information transmitted with each frame. The second color values are translated back to the signaling information using the look-up table described above and schematically illustrated in FIG. 7. According to the coding data of the exemplified sequence of frames, the color coding assigned to the one or more test lines of frames j indicate an "alert indication", the color coding assigned to the one or more test lines of frames j−1 indicate "no indication" and the color coding assigned to the one or more test lines of frames j−2 indicate a "warning indication".

With reference to the above examples, a coding scheme comprising two color values is exemplified. From the above description, it is immediately understood by the skilled person that the coding scheme may also comprise more than two color values assigned to the one or more test lines of a frame. In particular, the coding scheme as exemplified with reference to FIGS. 2 to 5 may be combined with the coding scheme as exemplified above with reference to FIGS. 6 to 8. One, two or more color values for a color coding may be used for verifying the integrity of the frame sequence. At least a further color value for the color coding may be used for transmitting signaling information from the source side part 110 to the destination side part 120 of the system.

A representative use case of the exemplified system for verifying integrity of a stream of image frames in the automotive field is vision application such as a digitized rear-view mirrors replacing the conventionally used interior and/or exterior rear-view mirrors by cameras. For instance, the presentation of a frozen image sequence of the rear view unnoticed to a driver represents an essential security risk. The system for verifying integrity of a stream of image frames is applicable to detect safety related errors in the presentation of the rear view captured by the cameras.

Another reprehensive use case of the exemplified system for verifying integrity of a stream of image frames in the automotive field is vision based ADAS, advanced driver assistance systems, such as an anti-collision or back spot warning system. The actions or indications caused by vision based ADAS may be erroneously remain undone or erroneously done in case the ADAS processes an erroneous image sequence, which does not reflect the current ambient conditions.

According to an example of the present application, a system for verifying integrity of a stream of image frames is provided. The system comprises a source side with a stream source and a destination side with a stream source destination, between which the stream is transmitted over a transmission medium. The source side includes an encoder logic module and a test line insertion logic module coupled upstream to the encoder logic module. The encoder logic module is arranged to generate an encoded stream by encoding the stream of image frames. The test line insertion logic module is configured to receive the image frames of the stream from the stream source and to include one or more test lines into each image frame. A color coding, which is selected from a coding scheme, is assigned to the one or more test lines. The destination side includes a decoder logic module and a test line detection and extraction logic module arranged downstream to the decoder logic module. The decoder logic module is arranged to generate a decoded stream by decoding the encoded stream received from the encoder logic module. The test line detection and extraction logic module is configured to extract the color coding from each image frame of the decoded stream, to verify coding data against the coding scheme and to issue an error signal in case the coding data mismatch with the coding scheme. The coding data comprises at least the extracted color coding.

According to an example of the present application, the coding scheme comprising a set of color codings having a predetermined sequence order. The test line insertion logic module is configured to select consecutively a color coding from the coding scheme.

According to an example of the present application, the test line insertion logic module is configured to select a color coding from the coding scheme in round-robin scheme.

According to an example of the present application, the color scheme comprises at least one set of color values: The color values in the at least one set of color values have a deterministic sequence order.

According to an example of the present application, the color scheme comprises a first set of color values and a second set of color values. The test line insertion logic module is configured to select consecutively a color value from each of the first and second sets. The selected color values represent a color coding.

According to an example of the present application, the color coding comprises a set of common color values. The test line insertion logic module is configured to select consecutively a color coding of two color values from the set of common color values. The two color values have a predetermined offset with respect to a predefined sequence order of the set of common color values.

According to an example of the present application, the test line insertion logic module is further configured to receive a signaling information and to translate the signaling information into a color value forming part of the color coding.

According to an example of the present application, the system further comprises a look-up table, which associated signaling information types with a respective one of different color values.

According to an example of the present application, the test line insertion logic module is further configured to include the one or more test lines in accordance with a test line configuration.

The test line configuration comprises at least one of a count parameter relating to a number of test lines, a position parameter relating to a position of the one or more test lines in the frames, an alignment parameter relating to a geometric alignment of the one or more test lines.

According to an example of the present application, the test line insertion logic module is further configured to append the one or more test lines to the frames.

According to an example of the present application, the test line detection and extraction logic module is further configured to remove the one or more appended test lines from the frames.

According to an example of the present application, the system further comprises a transmission medium, via which the encoded stream is transmitted from the source side to the destination side of the system.

According to an example of the present application, the test line insertion logic module is further configured to select a color coding for every $k^{th}$ image frame. In an example, the test line insertion logic module is further configured to select a color coding for every image frame. In another example, the test line insertion logic module is further configured to select a color coding for every $k^{th}$ image frame, where k=2, 3, 4, . . . .

According to an example of the present application, the system further comprises at least one coding scheme source configured to generate the set of color codings and to supply the color codings in a predetermined sequence order. The coding scheme source may be implemented as a state machine. The coding scheme source may be arranged with the test line insertion logic module and/or the test line detection and extraction logic module.

According to an example of the present application, an encoder logic module of a system for verifying a stream of image frames is provided. The encoder logic module comprises a test line insertion logic module configured to receive the image frames of the stream and to include one or more test lines into each image frame. A color coding is assigned to the one or more test lines. The color coding is selected from a coding scheme. The encoder logic module is configured to receive the image frames including the one or more test lines, to generate an encoded stream by encoding the stream of image frames and to transmit the encoded stream of image frames to a decoder logic module of the system for verifying the stream of image frames.

According to an example of the present application, a decoder logic module of a system for verifying a stream of image frames is provided. The decoder logic module is configured to receive an encoded stream, to generate a decoded stream of image frames by decoding the encoded stream and to output a decoded stream of image frames. The decoder logic module comprises a test line detection and extraction logic module configured to extract the color coding from one or more test lines included in each image frame of the decoded stream, to verify coding data against a coding scheme and to issue an error signal in case the coding data mismatch with the coding scheme. The color coding is assigned to the one or more test lines. The coding data comprises at least the extracted color coding.

The components of the system 100 comprising the source side part 110 with the encoder logic unit 230 and the destination side part 120 with the decoder logic unit 350 may be or may include a portion or all of one or more computing devices of various kinds. The computer system may include a set of instructions that can be executed to cause the computer system to perform any one or more of the methods or computer based functions disclosed.

The computer system can be implemented as or incorporated into various devices, such as various types of vehicle computer systems, e.g., Advanced Driver Assistance System (ADAS), Electronic/Engine Control Module, Powertrain Control Module, Transmission Control Module, Brake Control Module, a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. The computer system may be implemented using electronic devices that provide voice, audio, video or data communication. While a single computer system is illustrated, the term "system" may include any collection of systems or sub-systems that individually or jointly execute a set, or multiple sets, of instructions to perform one or more computer functions.

The computer system may include a processor, such as a central processing unit (CPU), a graphics processing unit (GPU), or both. The processor may be a component in a variety of systems.

The processor may be one or more general processors, digital signal processors, application specific integrated circuits, field programmable gate arrays, servers, networks, digital circuits, analog circuits, combinations thereof, or other now known or later developed devices for analyzing and processing data. The processor may have a multi-core processor design. The processor may implement a software program, such as code generated manually or programmed.

The term "module" or the term "unit" may be defined to include a number of executable modules or units. The modules or units may include software, hardware or some combination thereof executable by a processor, such as processor. Software modules may include instructions stored in memory, such as memory, or another memory device, that may be executable by the processor or other processor. Hardware modules may include various devices, components, circuits, gates, circuit boards, and the like that are executable, directed, and/or controlled for performance by the processor.

The computer system may include a memory, such as a memory that can communicate via a bus. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory includes a cache or random access memory for the processor. In alternative examples, the memory may be separate from the processor, such as a cache memory of a processor, the system memory, or other memory. The memory may include an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The functions, acts or tasks illustrated in the figures or described may be performed by the programmed processor executing the instructions stored in the memory. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system may or may not further include a display unit, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

The computer system may include an input device configured to allow a user to interact with any of the components of system. The input device may be a number pad, a keyboard, or a cursor control device, such as a mouse, or a joystick, touch screen display, remote control or any other device operative to interact with the computer system.

The computer system may include any data communication port or interface to receive data from an external source. An external source may be the image data streaming source 130, from which the stream S0 of image frames is received. An external source may be the source system part 110, from which the encoded stream S10 of modified image frames is received.

The computer system may include any data communication port or interface to transmit data from an external destination, e.g. the image data stream processing/displaying destination. An external destination may be the destination system part 120, to which the encoded stream S10 of modified image frames is transmitted. An external destination may be a display for displaying the image frames. Alternatively or additionally, an external destination may be an image evaluation system being part of for instance an object recognition system of an anti-collision system.

The data communication port or interface may comprise any general purpose data communication ports or interfaces or data communication ports or interfaces adapted to communicated specific data. General purpose data communication ports or interfaces may comprise an Ethernet port/interface, a network technology based port/interface and the like. Specific data communication ports or interfaces may comprise a display port/interface.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 500 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

Those of skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

In the claims, any reference signs placed between parentheses shall not be construed as limiting the claim. The word "comprising" does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A system for verifying integrity of a stream of image frames, said system comprising:
    a source side including encoder logic and test line insertion logic coupled upstream to the encoder logic, which is arranged to generate an encoded stream by encoding the stream of image frames, wherein the test line insertion logic is configured to receive the image frames of the stream from a source and to include one or more test lines into each image frame, and wherein a color coding, which is selected from a coding scheme, is assigned to each of the one or more test lines; and
    a destination side including decoder logic and a test line detection and extraction logic arranged downstream to the decoder logic, which is arranged to generate a decoded stream by decoding the encoded stream received from the encoder logic, wherein the test line detection and extraction logic is configured to:
        extract the color coding from each of the one or more test lines in the image frame of the decoded stream,
        verify coding data against the coding scheme on the basis of the color coding extracted from a current frame and the color codings extracted from a predefined number of previous frames received from the encoder logic,
        issue an error signal in case the coding data mismatch with the coding scheme, wherein the coding data comprises at least the extracted color coding and the error signal indicates defective encoding or decoding of the image frame.

2. The system according to claim 1, wherein the coding scheme comprising a set of color codings having a predetermined sequence order, wherein the test line insertion logic is configured to select consecutively a color coding from the coding scheme.

3. The system according to claim 1, wherein the test line insertion logic is configured to select a color coding from the coding scheme in round-robin scheme.

4. The system according to claim 1, wherein the color scheme comprises at least one set of color values, wherein the color values in the at least one set of color values have a deterministic sequence order.

5. The system according to claim 4, wherein the color scheme comprises a first set of color values and a second set of color values, wherein the test line insertion logic is configured to select consecutively a color value from each of the first and second sets, wherein the selected color values represent a color coding.

6. The system according to claim 4, wherein the color coding comprises a set of common color values, wherein the test line insertion logic is configured to select consecutively a color coding of two color values from the set of common color values, wherein the two color values have a predetermined offset with respect to a predefined sequence order of the set of common color values.

7. The system according to claim 1, wherein the test line insertion logic is further configured to receive signaling information and to translate the signaling information into a color value forming part of the color coding to indicate an alert instead of the warning.

8. The system according to claim 1, comprising:
    a look-up table associating signaling information types with a respective one of different color values.

9. The system according to claim 1, wherein the test line insertion logic is further configured to include the one or more test lines in accordance with a test line configuration comprising at least one of a count parameter relating to a number of test lines, a position parameter relating to a position of the one or more test lines in the frames, an alignment parameter relating to a geometric alignment of the one or more test lines.

10. The system according to claim 1, wherein the test line insertion logic module is further configured to append the one or more test lines to the frames.

11. The system according to claim 10, wherein the test line detection and extraction logic is further configured to remove the one or more appended test lines from the frames.

12. The system according to claim 1, wherein the test line insertion logic is further configured to select a color coding for every $k^{th}$ image frame, where k is a number greater than one.

13. The system according to claim 1, further comprising:
    at least one coding scheme source configured to generate the set of color codings and to supply the color codings in a predetermined sequence order.

14. A decoder of a system for verifying a stream of image frames, wherein the decoder is configured to receive an encoded stream, to decode the encoded stream and to output a decoded stream of image frames, and wherein the decoder logic comprises:
    test line detection and extraction logic configured to extract a color coding from one or more test lines included in each image frame of the decoded stream, to verify coding data against a coding scheme on the basis of the color coding extracted from the one or more test lines in a current image frame and the color codings extracted from the one or more test lines in two or more previous image frames received from the encoder logic, and to issue an error signal when the coding data mismatches with the coding scheme, wherein the coding data comprises at least the extracted color coding.

15. The decoder according to claim 14, wherein the coding scheme comprises a set of color codings having a predetermined sequence order.

16. The decoder according to claim 14, wherein the color scheme comprises at least one set of color values, wherein the color values in the at least one set of color values have a deterministic sequence order.

17. The decoder according to claim 16, wherein the color scheme comprises a first set of color values and a second set of color values, and wherein the selected color values represent a color coding.

18. The decoder according to claim 14, wherein the test line detection and extraction logic is further configured to remove appended test lines from the image frames.

\* \* \* \* \*